United States Patent [19]
Collins et al.

[11] Patent Number: 5,958,113
[45] Date of Patent: Sep. 28, 1999

[54] MODULAR HYDRO FILTRATION VACUUM EXTRACTION MACHINE

[75] Inventors: Gary W. Collins; Kehl T. LeSourd, both of Reno, Nev.

[73] Assignee: Thermax, Inc., Reno, Nev.

[21] Appl. No.: 09/040,297

[22] Filed: Mar. 18, 1997

[51] Int. Cl.[6] .................................................. B01D 47/02
[52] U.S. Cl. .............................. 96/329; 96/349; 96/361; 55/DIG. 3; 15/353
[58] Field of Search .............................. 96/329, 333, 337, 96/348, 349, 331, 361; 55/DIG. 3, 429; 15/353

[56] References Cited

U.S. PATENT DOCUMENTS

| | | | |
|---|---|---|---|
| 4,278,456 | 7/1981 | Hug | 55/429 |
| 4,287,635 | 9/1981 | Jacobs | 15/353 |
| 4,300,924 | 11/1981 | Coyle | 96/349 |
| 4,915,640 | 4/1990 | Hayden . | |
| 5,109,568 | 5/1992 | Rohn et al. . | |
| 5,189,755 | 3/1993 | Yonkers et al. . | |
| 5,343,592 | 9/1994 | Parise | 15/353 |
| 5,387,117 | 2/1995 | Moyher, Jr. et al. . | |
| 5,455,984 | 10/1995 | Blasé . | |
| 5,752,997 | 5/1998 | Roth | 15/353 |

*Primary Examiner*—Jay H. Woo
*Assistant Examiner*—Robert A. Hopkins
*Attorney, Agent, or Firm*—Sughrue, Mion, Zinn, Macpeak & Seas, PLLC

[57] ABSTRACT

An improved water vacuum extraction machine having a modular design allowing the detergent container to be removed when the machine is used in the vacuum mode when the detergent solution is not required. The water vacuum extraction machine includes a removable water filter to allow for the hydro filtration tank to be cleaned more easily. Further, an added filter is provided downstream of the suction motor to thereby reduce the amount of particles which are released into the environment. Specifically, the machine includes an outer casing including a bottom wall and a top wall and defining a chamber therein and a recovery tank removably positioned within the chamber. The hydro filter is disposed within the recovery tank and includes an inner tube and an outer which are concentrically arranged to define an annular space therebetween. A top end of the inner tube communicates with a hose of the vacuum to suction a return stream, including contaminants, therethrough, the outer tube being closed at its bottom and spaced axially from an open lower end of the inner tube. An upper portion of the outer tube has an outlet port and a lower portion of the outer tube has an inlet port, and the inlet and outlet ports are open to the interior of the recovery tank and to the annular space between the concentric inner and outer tubes. Therefore, liquid filling the recovery tank above the level of the water inlet port is aspirated by the return stream to cause contaminants within the return stream to be entrained by the water for primary filtration of the return flow stream as the return stream flows through the annular space and out the outlet port. The entire hydro filter is removably secured to the filtration tank. Further, the outer tube includes a baffle projecting outwardly therefrom which is adjacent the outlet port for directing the contaminated return stream back toward the water.

24 Claims, 8 Drawing Sheets

MODULAR HYDRO FILTRATION VACUUM EXTRACTION MACHINE

BACKGROUND OF THE INVENTION

1. Field of the Invention

This invention relates to a device which functions both as a hydro filtration vacuum cleaner as well as a hydro extractor for cleaning carpets. More particular, the invention relates to a device which has a modular construction as well as improved filtration and cleanability.

2. Background of the Invention

The present invention is an improvement in the field of compact home vacuum extraction machines exemplified by U.S. Pat. No. 5,394,587, issued Mar. 7, 1995 to Carl Parise and entitled "HOT WATER VACUUM EXTRACTION MACHINE WITH FLOAT SEALED RISER TUBE SHUT-OFF DEVICE; U.S. Pat. No. 5,343,592, issued Sep. 6, 1994 to Carl Parise and entitled "HOT WATER VACUUM EXTRACTION MACHINE WITH SUBMICRON SIZED PARTICLE"; U.S. Pat. No. 4,078,908, issued Mar. 14, 1978 to R. Eugene Blackman and entitled "DUMP BUCKET FOR A WET-DRY VACUUM SYSTEM HAVING IMPROVED LIQUID FLOAT CHARACTERISTIC"; U.S. Pat. No. 4,083,705, issued Apr. 11, 1978 to Carl Parise et al. and entitled "DUMP BUCKET FOR A WET/DRY VACUUM SYSTEM"; and U.S. Pat. No. 4,145,198, issued Mar. 20, 1979 to Thomas M. Laule and entitled "SINGLE TUBE HYDRO AIR FILTER WITH DIVIDING WALL".

Such machines eliminate a problem in the dry vacuum cleaner art which has existed for many years. Typically, a dry vacuum cleaner employs a porous bag, within which air is drawn by vacuum pressure from an electric motor driven vacuum pump, which sucks into the bag dust particles from a rug or other surface being cleaned through a vacuum head. The largest of the dust and dirt particles are retained internally within the bag. However, the very nature of the dry vacuum cleaner porous bag operation requires that the air stream entering the bag escape through the pores of the bag. Any dust particles which are sized less than the size of the pores naturally escape through those pores as well, returning to the room being cleaned resulting in an atmosphere of small dust particles floating around after cleaning has been terminated. Accordingly, dry vacuum cleaners in large part simply transfer the dirt particles in a rug to the air in the room. Another problem with dry vacuum cleaners is that the pores of the bag quickly becomes clogged resulting in very poor air flow, and attendantly an inefficient vacuum.

Some of the hot vacuum extraction machines, as set forth in the above-identified patents, overcome the inefficiencies of the dry vacuum cleaner by using water filtration. Further, U.S. Pat No. 5,343,592, noted above, includes an additional filter to improve the overall filtration. While this vacuum extraction machine has been successful, there are some inefficiencies associated with it. Firstly, the size of the machine is rather bulky making it less desirable for residential use. One reason for the added bulk is the necessity that there be a suitably sized container for retaining the detergent solution when the machine is used as a hot water extractor (i.e., a steam cleaning machine). In general, the machine is used primarily as a vacuum cleaning machine in which the detergent solution is not necessary. Thus, it is inefficient to include the detergent solution container as an integral part of the machine.

Another problem with the cleaner disclosed in U.S. Pat. No. 5,343,592 is that it can be difficult to clean the water filtration tank which is used in both the vacuum mode and the hot water extraction mode. In particular, the water filtration tank includes a filtration tank which is filled with water and a water filter which is immersed in the water. The water filter includes an inner and outer tube arrangement. While the inner tube is removable from the filtration tank, the outer tube is not removable. Thus, it is difficult to adequately clean the inside of the filtration tank, and particularly the areas of the tank at which the outer tube is joined to the filtration tank.

Another deficiency of this conventional cleaner is that the filtration tank protrudes from the machine thus impairing the aesthetic appeal of the overall cleaner.

SUMMARY OF THE INVENTION

In view of the foregoing, a primary object of the present invention is to provide an improved water vacuum extraction machine having a modular design allowing the detergent container to be removed when the machine is used in the vacuum mode in which the detergent solution is not required. Another object of the invention is to provide a water vacuum extraction machine which includes a removable water filter to allow for the hydro filtration tank to be cleaned more easily.

Yet a further object of the present invention is to provide an added filter which is downstream of the suction motor to thereby reduce the amount of particles which are released into the environment.

These and other objects are achieved by the hydro vacuum extraction machine of the present invention. According to a first aspect of the invention, the hydro vacuum extraction machine comprises: an outer casing including a bottom wall and a top wall and defining a chamber therein; a recovery tank removably positioned within the chamber; a hydro filter disposed within the recovery tank and including an inner tube and an outer which are concentrically arranged to define an annular space therebetween, a top end of the inner tube communicating with a hose of the vacuum to suction a return stream, including contaminants, therethrough, the outer tube being closed at its bottom and spaced axially from an open lower end of the inner tube, an upper portion of the outer tube having an outlet port and a lower portion of the outer tube having an inlet port, the inlet and outlet ports opening to the interior of the recovery tank and being open to the annular space between the concentric inner and outer tubes, such that liquid filling the recovery tank above the level of the at least one water inlet port is aspirated by the return stream to cause contaminants within the return stream to be entrained by the water for primary filtration of the return flow stream as the return stream flows through the annular space and out the outlet port; and connecting means for connecting the hydro filter to the filtration tank in a removable manner, such that the hydro filter can be removed for cleaning of the filtration tank and the hydro filter.

According to another aspect of the invention, the connecting means includes a projection extending from the outer tube and a guide groove provided in the filtration tank, the projection being received in the guide groove. Further, the projection and the guide groove have a dove-tailed shape.

According to another aspect of the invention, the outer tube includes a baffle projecting outwardly therefrom which is adjacent the outlet port. The baffle includes a horizontal plate and a vertical plate, the vertical and horizontal plates directing the return flow stream downwardly back into the water for secondary filtration. The horizontal plate extends from a top of the outlet port and the vertical plate extends from a side of the outlet port. Further, the horizontal plate and the vertical plate are integral to each other.

According to a further aspect of the invention, the water vacuum extraction machine further comprises: a suction motor; a suction passage communicating the suction motor with the filtration tank so as to suction the return stream from the filtration tank to the atmosphere; and a filter disposed downstream of the suction motor for further filtering the return stream.

DESCRIPTION OF THE PREFERRED EMBODIMENT

Figure 1:
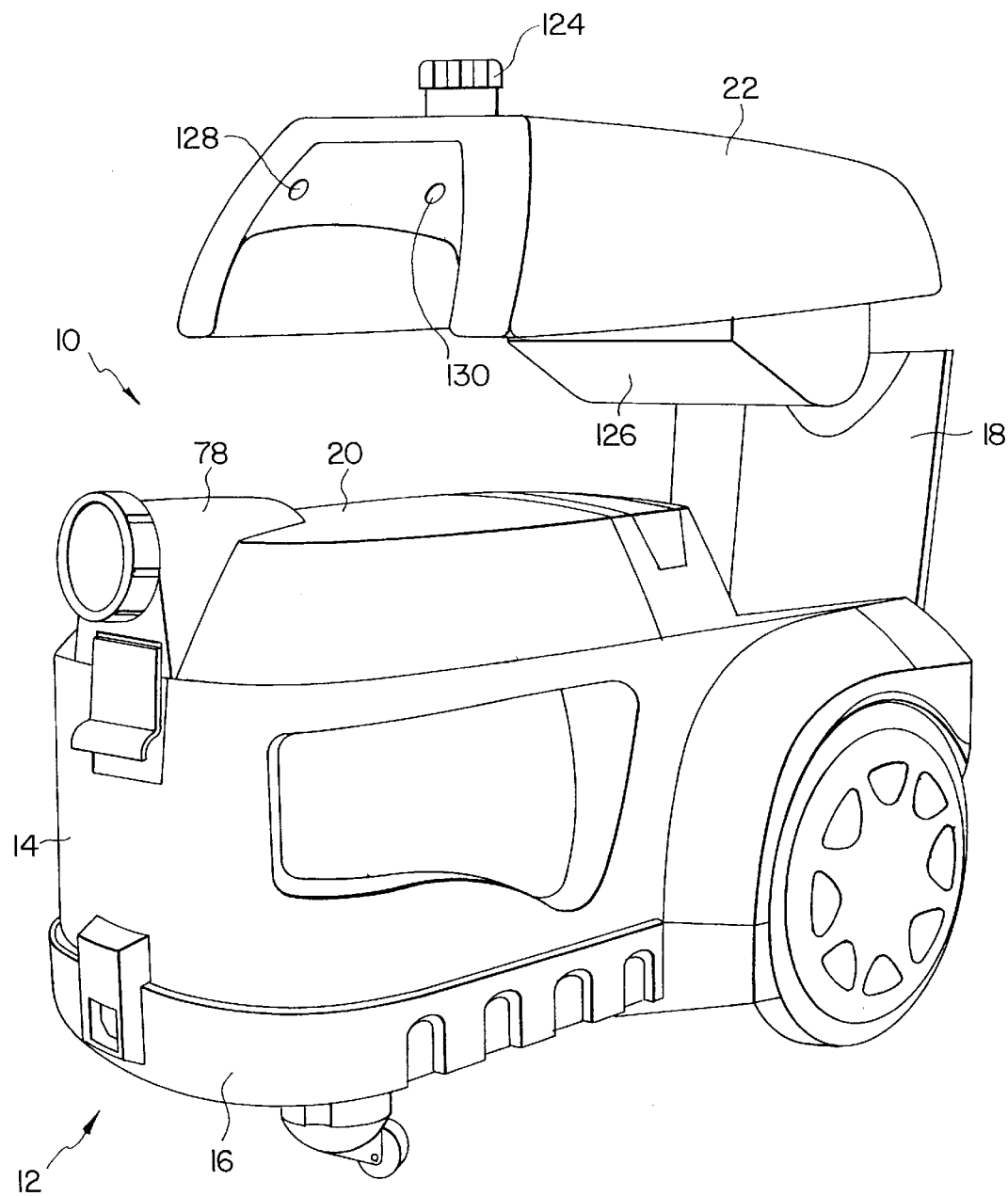
FIG. 1 is an exploded perspective view of an improved water vacuum extraction machine with a removable hydro extraction module.
Figure 2:
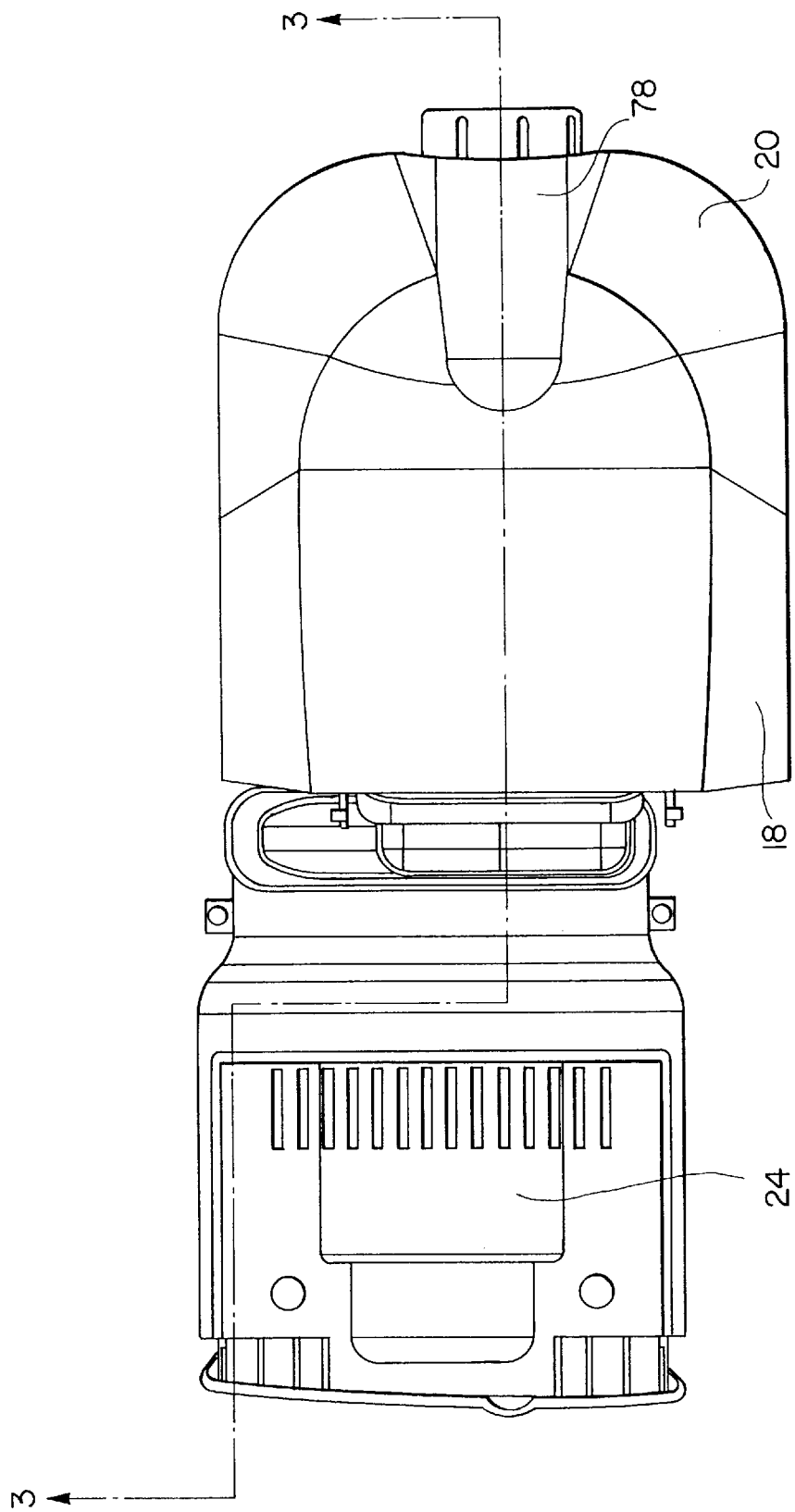
FIG. 2 is a top view of the water vacuum extraction machine of FIG. 1 with the hydro extraction module removed.

Referring to the drawings, the improved vacuum extraction machine forming a preferred embodiment of the invention is indicated generally at 10 and is formed of a number of main components or elements. As seen in FIG. 1, the water vacuum extraction machine 10 includes a casing 12 formed of injection molded plastic, as are the majority of the components of the machine. The casing 12 consists of an upper case 14 and a lower case 16. A rear lid 18 is pivotally attached to the rear portion of the upper case 14 and a front lid 20 is attached to the mid portion.

A hydro extraction module 22 is removably positioned on top of the casing 12 for use in the vacuum extraction (i.e., steam cleaning) mode. In particular, the hydroextraction module 22 stores a detergent solution which is used for cleaning the carpet. As discussed below, when the machine is used in the vacuum mode, the hydroextraction module 22 is removed to provide for a more compact and lightweight vacuum machine.

Internally of the casing 12 is located a vacuum motor 24 located at the rear of the casing and a hydro filtration unit 26 located to the front of the casing. The vacuum motor is mounted in the lower case 16.

The hydro filtration unit 26 filters the vacuumed particles from the return air suctioned through a vacuum hose 28 by the vacuum motor 24. In particular, the hydro filtration unit 26, which is used in part during the machine operation under wet vacuum extraction mode, includes a filtration tank 30 filled with water and which has internally mounted therein a hydro filter indicated generally at 32. The system involves principally the interaction of water and air to separate dirt particles from the return air and dirt stream from a carpet, upholstery or the like being cleaned as indicated by arrows.

Such a hydropneumatic water filtration device operates under the same basic principal as that disclosed in U.S. Pat. Nos. 4,078,908, 4,083,705, 4,145,198 and 5,343,592.

The various elements of the machine will now be described in detail. As noted above, the hydro filtration unit 26 includes a filtration tank 30 having a hinged cover 31 and within which is provided the hydro filter 32. In the vacuum mode the filtration tank is filled with water to a predetermined water line W. The hydro filter 32 consists of an outer tube 34 which is removably attached to the inside of the filtration tank 30, as described below, and an inner tube 36. The inner tube 36 includes an upper flange 38 which allows the inner tube to be rotatably and removably attached to an upper flange 39 of the outer tube 34. Specifically, the upper flanges of the inner and outer tubes are constructed to include a bayonet mount, which is a known type of mount and hence is not shown or further described.

The outer tube 34 is closed at the bottom 40 but has a pair of circumferentially slotted inlet ports 42 near the bottom of the tube, below the water line W, to allow water from the tank to enter into the cavity 44 defined by the outer tube, as shown. Similarly, a pair of outlet ports 46 are provided on opposite sides of the outer tube 34 near the top of the tube, above the water level W. The inner tube 36 and the outer tube 34 are relatively sized so as to be spaced radially from each other by a predetermined distance so as to define an annular flow path 48 therebetween.

Figure 8:
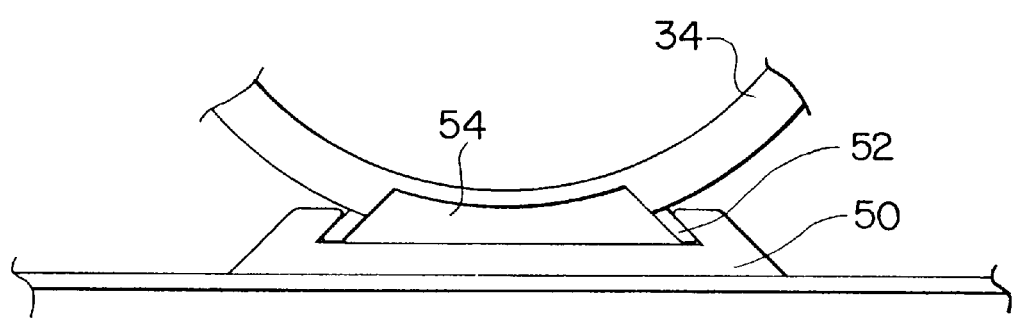
FIG. 8 is a fragmentary plan view of the manner in which the hydro filtration unit is attached to the filtration tank.

As noted above, one of the important features of the invention is that both the inner and outer tubes of the filtration system are removable from the tank. Referring to FIG. 8, this is accomplished in the following manner. Molded in the front interior surface of the filtration tank 30 is a securing member 50 having a dove-tailed recess 52 for receiving a complementary shaped dove-tailed protrusion 54 which extends from the front side of the outer tube 34. Thus, the outer tube 34 is attached to the filtration tank 30 by simply sliding the outer tube downwardly so that the dove-tailed projection 54 of the outer tube 34 is received in the dove-tailed recess 52 of the filtration tank 30. On the other hand, as noted above, the inner tube 36 includes an upper flange 38 which is mateable with the upper flange 39 of the outer tube 34 by rotation in a bayonet-like manner. By virtue of this design, the hydro filtration tank can be easily cleaned by simply removing the filtration tank 30 from the casing 12, opening the hinged cover 31, and removing the inner tube 36 and outer tube 34. This is a significant improvement over the device disclosed in U.S. Pat. No. 5,394,587 where the outer tube is permanently fixed within the tank making it difficult to reach into the tank to clean it.

Figure 5:
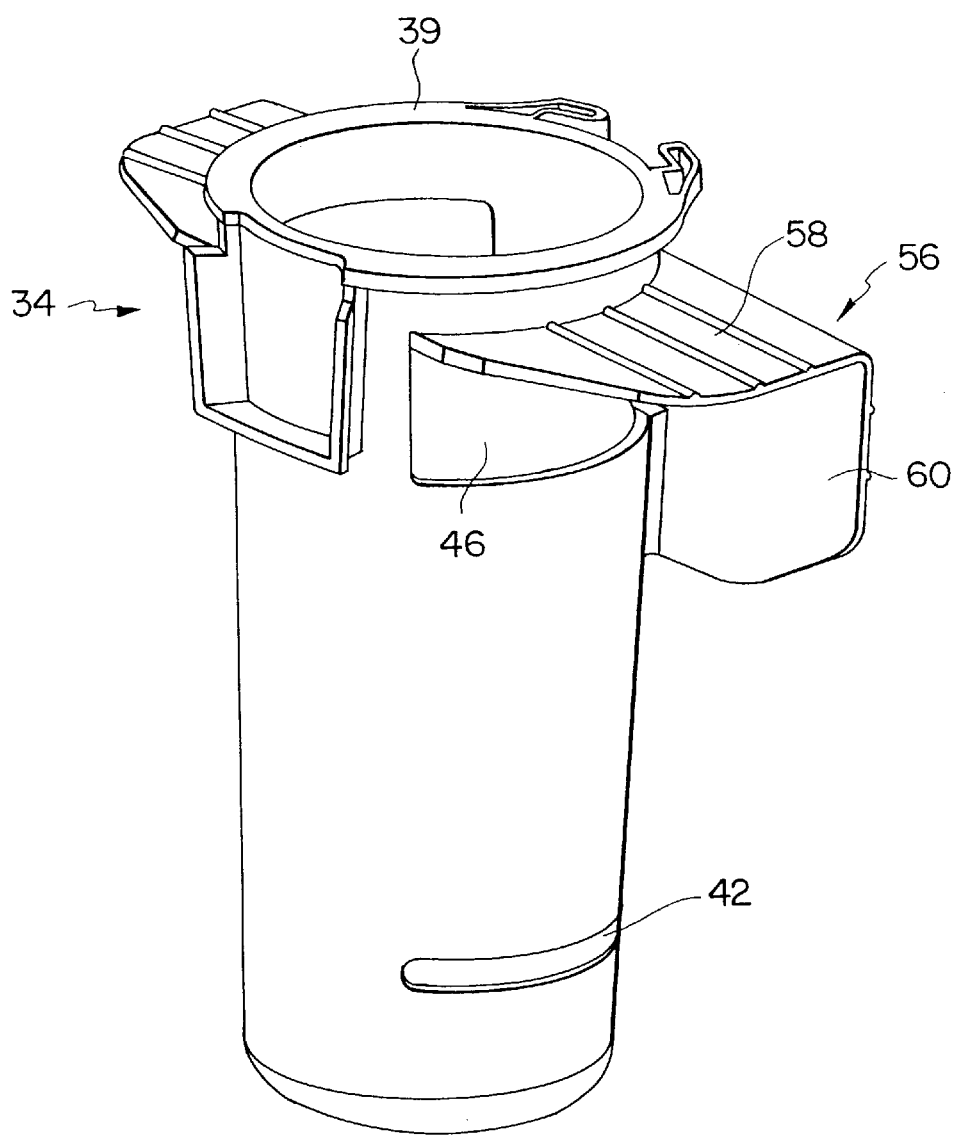
FIG. 5 is a perspective view of the outer tube of the hydro filtration unit of FIG. 4.
Figure 6:
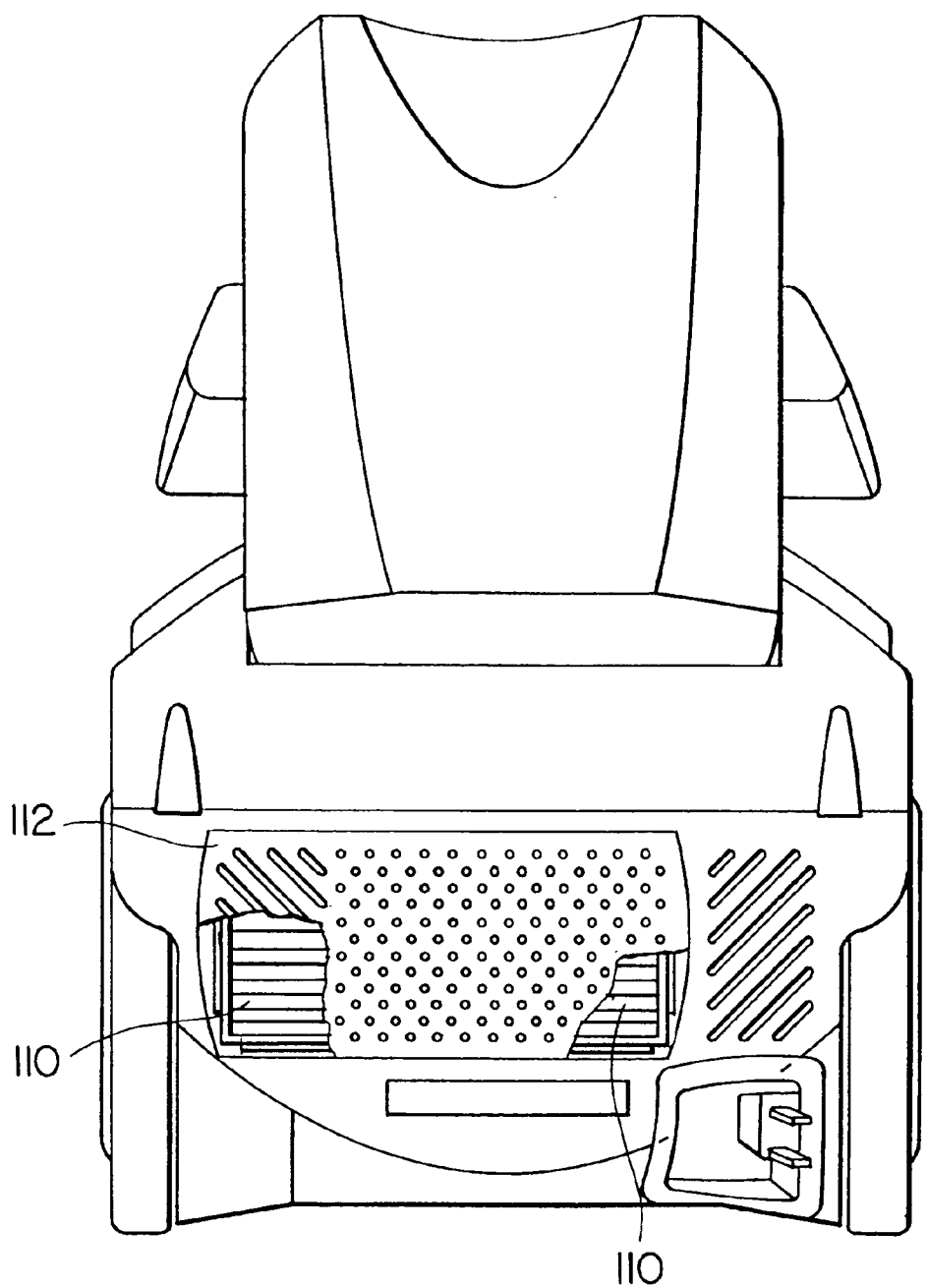
FIG. 6 is a rear view of the water vacuum extraction machine.
Figure 7:
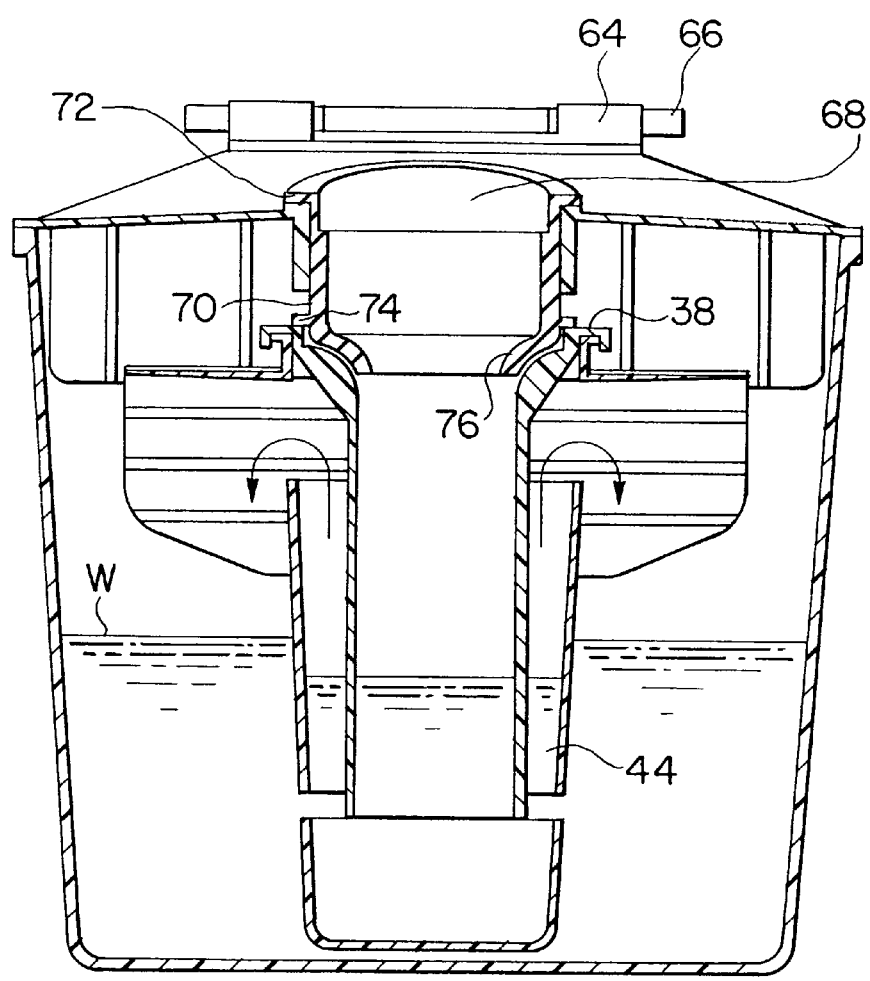
FIG. 7 is a front view of the hydro filtration unit.

Another important feature of the outer tube is the presence of deflector baffles 56 which extend from opposite lateral sides of the outer tube 34, as shown in FIGS. 5–7. In particular, each deflector baffle 56 includes a horizontal baffle 58 disposed just above the outlet port 46 as well as a vertical baffle 60 so that the deflector baffles have an L-shaped cross section. With reference to FIG. 7, these deflector baffles 56 perform two important functions. Firstly, the baffles force the pressurized air exiting the outlet ports 46 of the outer tube 34 downwardly toward the water to create additional turbulence in the water. This results in additional filtration of the vacuumed air. Secondly, the deflector baffles prevent water from being suctioned into the return line indicated by arrow R, discussed in detail below. Specifically, the baffles 58 are located on the return line side of the outer tube 34 thereby acting as a shield so that water cannot be suctioned directly from the outlet ports 46 to the return line R.

The remaining features of the filtration unit 26 are as follows. As noted above, the hydro filtration unit 26 includes a cover 31 which is pivotally secured to the filtration tank 30 by a hinge 62 on the rear side of the tank. Attached to the top of the cover 31 is a plate 64 to which a handle 66 is rotatably secured at the center portion of the cover. The handle allows the hydro filtration tank to be easily removed for cleaning and/or filling with water. The cover 31 includes an inlet opening 68 in a front portion thereof around which is provided a tank inlet seal 70. The tank inlet seal 70 is made of rubber and include an upper flange 72 and a lower flange 74 so that it can be fixedly retained within the tank inlet opening, as shown. The bottom portion 76 of the tank seal has a conical shape allowing it to be mated with the inner peripheral portion at the top of the inner tube to create a tight seal therebetween.

As noted above, the front lid 20 is pivotally attached to the upper casing 14. Incorporated within the front lid is an inlet elbow 78 through which the vacuumed air is suctioned. The inlet elbow includes a horizontal portion 80 to which the vacuum hose is attachable and a vertical portion 82 which communicates with the tank inlet opening. A front lid seal 84 is attached to the bottom of the vertical portion such that when the front lid is in the closed position, the front lid seal 84 mates with the tank inlet seal 70 to form a tight seal therebetween.

Figure 3:
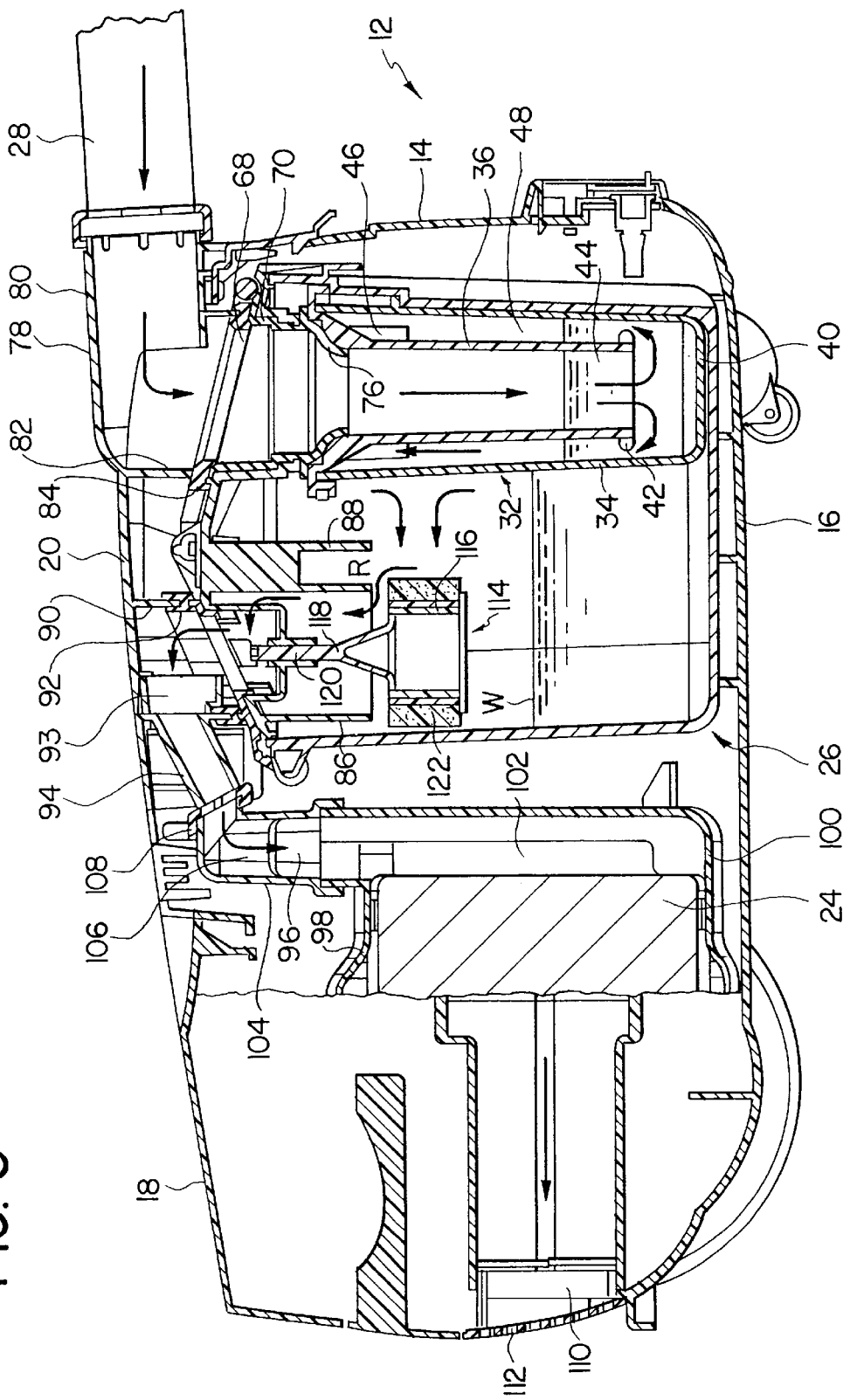
FIG. 3 is a cross-sectional view of the hydro extraction module taken along line 3—3 of FIG. 2.
Figure 4:
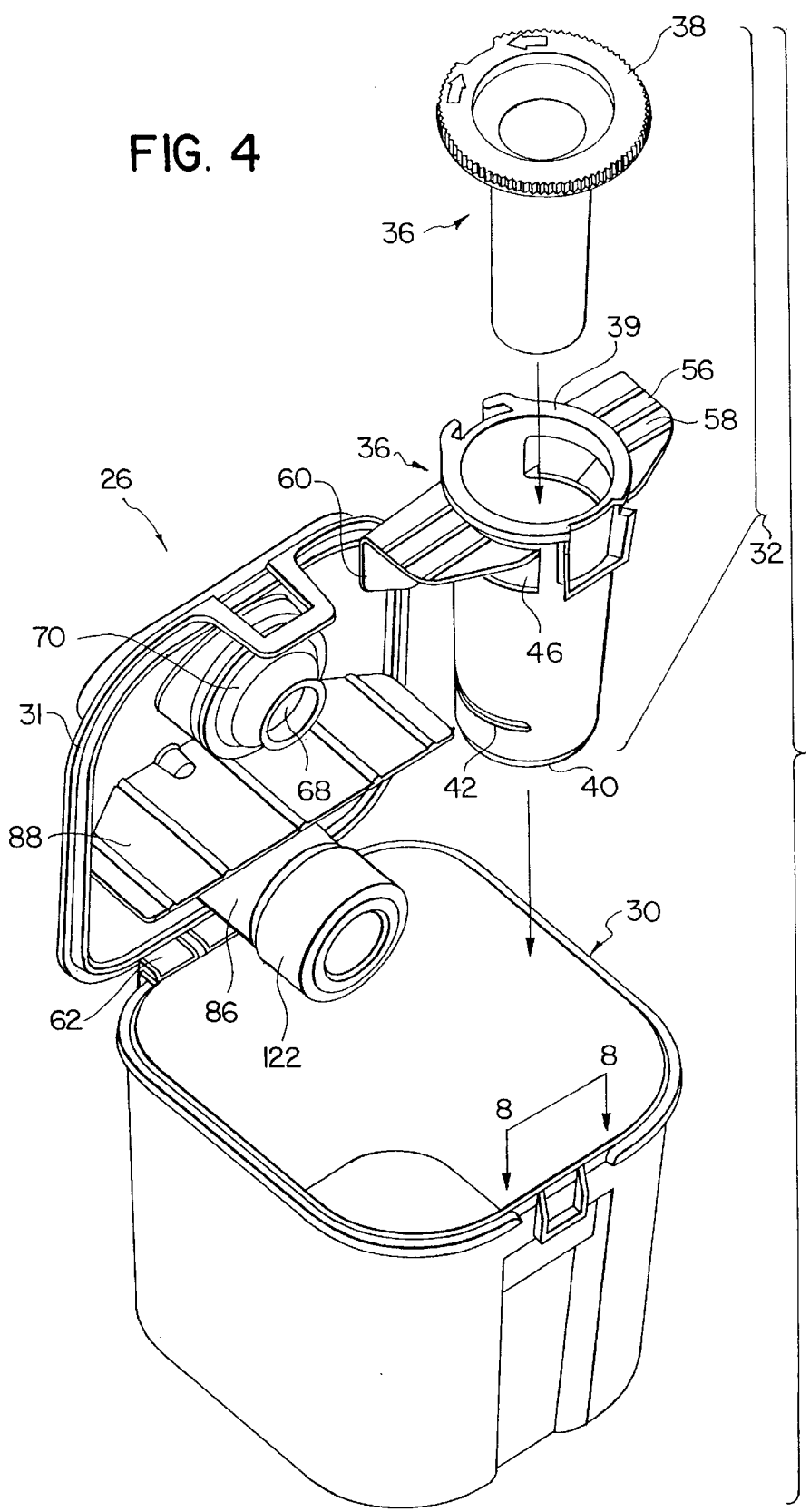
FIG. 4 is an exploded perspective view of the hydro filtration unit of the water vacuum extraction machine.

The following is an explanation of the filtration achieved by the filtration unit 26. For dirt and dust filtration of the returned stream, water W must be at such a level in the filtration tank 30 so as to rise above the level of the inlet ports 42 provided in the outer tube. Similarly, for the desired action, the length of the inner tube 36 (fluid return tube) must be such that its lower end is above the closed bottom of the outer tube 34 by a predetermined distance. Water penetrates the interior of the outer tube 34 via the inlet ports 42 and enters the lower end of the inner tube as shown in FIG. 3. During operation, the incoming vacuumed air is suctioned through the hose 28, through the inlet elbow 78 of the front lid 20 and downwardly through the inner tube 36 so that it percolates the water as the air passes downwardly through the inner tube and around the lower edge of the inner tube. The air then escapes through the annular space 48 between the inner and outer tubes. Thereafter, the air is evacuated through outlet ports 46 of the outer tube 34 and deflected downwardly toward the water to create additional turbulence in the water, as discussed above. Thus, this arrangement results in double filtration: the first filtration occurs when the contaminated air is suctioned through the water internally to the outer tube and the second filtration occurs when the contaminated air is forced against the surface of the water on the exterior of the outer tube.

The foregoing describes the flow path from the vacuum hose 28 to the hydro filtration unit 26 for performing the primary filtration of the vacuumed contaminated air. The following is a description of the remaining flow path for suctioning the filtrated air from the filtration unit 26 to the vacuum pump and eventually to the machine exhaust port.

The cover 31 to the hydro filtration tank includes an exhaust tube 86 which is integrally molded on the rear portion of the cover and which extends downwardly from the cover into the filtration tank 30. A transverse baffle 88 also extends from the cover and into the tank so as to extend laterally from one side of the tank to the other side. The purpose of the transverse baffle 88 is to further prevent water particles from being suctioned through the exhaust tube 86 and into the vacuum motor.

As shown in FIG. 3, the front lid includes an exhaust manifold 90 having a portion which protrudes downwardly and which communicates with the exhaust tube 86 of the tank cover 31. The bottom portion of the exhaust manifold has a rear seal 92 which is secured thereto for mating with the upper surface of the filtration tank 30 cover around the exhaust tube 86. In this manner, an air tight seal is created between the exhaust manifold 90 of the front lid 20 and the exhaust tube 86 of the filtration cover 31. The exhaust manifold 90 also includes a recess for receiving a relatively course filter 93. The purpose of this filter is two-fold. First, the filter serves as a tertiary filtration for further filtering the vacuumed air to remove additional dirt particles. Secondly, the filter traps water droplets from the filtration tank.

Downstream of the filter 93, the exhaust manifold 90 includes a rectangular exhaust tube 94 which communicates with a downstream vacuum channel 96 which in turn communicates with the vacuum motor 24.

In more detail, as noted above, positioned in the rear portion of the casing is the vacuum motor 24 which is located inside of upper 98 and lower 100 vacuum housings. The forward portion of the upper and lower vacuum housings defines a lower vacuum channel 102, as shown in FIG. 3. An upper channel member 104 is provided above the lower vacuum channel 102 and includes an upper vacuum channel 106 in communication with the lower vacuum channel 102. A channel seal 108 is secured to the upper channel member to provide an airtight seal between the upper channel member 104 and the upstream exhaust tube 94 of the front lid 20.

As can be appreciated from the foregoing, the vacuum channel 96 defined by the lower vacuum channel 102 and the upper vacuum channel 106 allows vacuum pressure from the vacuum motor to be applied to the hydro filtration tank 26 via the exhaust manifold 90 associated with the front lid 20. With the presence of the filter 93 in the exhaust port in the lid, the device provides for tertiary filtration of the air between the inlet to the device and the suction motor.

However, according to another important aspect of the invention, there is provided a pair of conventional filters 110 on the rear side of the vacuum pump, as shown in FIGS. 3 and 6. These filters are replaceable by simply pivotally opening the rear door 112 and withdrawing them by hand. The importance of these filters is two-fold. Firstly, they are very fine filters which provide a fourth filtration of the vacuumed air. Secondly, since these filters are downstream of the vacuum motor, they prevent contaminants generated in the vacuum motor from being released to the atmosphere. This is a significant improvement over the conventional filtration systems.

When the device is used in the vacuum extraction mode (i.e., steam cleaning mode), the hydro extraction module which stores the detergent solution is first positioned on the casing 12 in the manner shown in FIG. 1. Thereafter, the machine is turned on and the detergent solution is applied to the carpet through a tubing, which runs along a conventional vacuum hose, and a shampoo head. After the solution detergent has been applied, the dirty detergent solution is suctioned into the filtration tank via the hose. In this mode, the filtration tank is initially empty of water since the machine is used for suctioning the dirty detergent solution from the rug, and not for filtering, as when the machine is used in the vacuum mode. In order to prevent overflowing of the water into the tank, there is provided a float assembly 114 which is slidably attached within the exhaust tube 86 of the filtration cover 31.

Specifically, the float assembly 114 includes a float cup 116 having a shaft 118 which extends upwardly therefrom and is slidably received in a hole 120 centrally located with respect to the exhaust tube. Circumscribing the float cup is a float ring 122. The density of the material of the float cup is selected such that, under normal conditions, the float ring and cup is in the lowermost position (FIG. 3) to allow the air to be exhausted. On the other hand, as the water level rises in the filtration tank 30, the float ring floats upwardly so as to abut against the lower end of the exhaust tube 36 to provide a water-tight seal to prevent air entrained water from passing through the exhaust port when subjected to normal vacuum pressure. This prevents the suction pump from drawing in the detergent solution into the vacuum motor 24.

The hydro extraction module 22 has a solution tank which normally stores a solution including hot water and a detergent. A cap 124 is provided in the top of the hydroextraction module for pouring the solution into the tank. A water pump (not shown) is secured on the lower side 126 of the hydro extraction module for pumping the detergent solution therefrom. Extending from the front of the hydroextraction module is a conventional quick-disconnect 128 to which a tube is attachable. When the pump is activated, the detergent solution is pumped via the tube to the steam cleaning head (not shown) of the vacuum whereupon the detergent solution is sprayed on the carpet during the hydro extraction mode (i.e., steam cleaning). Also, an electrical cord extends from a hole 130 in the front face of the hydroextraction module for supplying power to the water pump associated with the module.

While the invention has been described in detail with reference to a specific embodiment thereof, it will be apparent to one skilled in the art that various changes and modifications may be made therein without departing from the spirit and scope of the invention.

We claim:

1. A hydro vacuum extraction machine, comprising:
   an outer casing including a bottom wall and a top wall and defining a chamber therein;
   a filtration tank removably positioned within said chamber;
   a lid for covering said filtration tank;
   a hydro filter disposed within said filtration tank and including an inner tube and an outer tube which are concentrically arranged to define an annular space therebetween, a top end of said inner tube communicating with a hose of said vacuum to suction a return stream, including contaminants, therethrough, said outer tube being closed at its bottom and spaced axially from an open lower end of said inner tube, an upper portion of said outer tube having an outlet port and a lower portion of said outer tube having an inlet port, said inlet and outlet ports opening to the interior of said filtration tank and being open to said annular space between said concentric inner and outer tubes, such that liquid filling the filtration tank above the level of said at least one water inlet port is aspirated by said return stream to cause contaminants within said return stream to be entrained by said water for primary filtration of said return flow stream as said return stream flows through said annular space and out said outlet port; and
   a connector for connecting said hydro filter directly to said filtration tank in a removable manner, such that said hydro filter, including said inner and outer tubes, can be removed for cleaning of said filtration tank and said hydro filter.

2. The hydro vacuum extraction machine of claim 1, wherein said connector includes a projection extending from said outer tube and a guide groove provided in said filtration tank, said projection being received in said guide groove.

3. The hydro vacuum extraction machine of claim 2, wherein projection and said guide groove have a dove-tailed shape.

4. The hydro vacuum extraction machine of claim 1, wherein said outer tube includes a baffle projecting outwardly therefrom.

5. The hydro vacuum extraction machine of claim 4, wherein said baffle is adjacent said outlet port and includes a horizontal plate and a vertical plate, said vertical and horizontal plates directing said return flow stream downwardly back into said water for secondary filtration.

6. The hydro vacuum extraction machine of claim 5, wherein said horizontal plate extends from a top of said outlet port and said vertical plate extends from a side of said outlet port.

7. The hydro vacuum extraction machine of claim 6, wherein said horizontal plate and said vertical plate are integral to each other.

8. The hydro vacuum extraction machine of claim 1, further comprising:
   a suction motor;
   a suction passage communicating said suction motor with said filtration tank so as to suction said return stream from said filtration tank to the atmosphere; and
   a filter disposed downstream of said suction motor for further filtering said return stream.

9. The hydro vacuum extraction machine of claim 1, further comprising a module for storing a solution for cleaning a floor, said module being removably secured to said outer casing.

10. A hydro vacuum extraction machine, comprising:
    an outer casing including a bottom wall and a top wall and defining a chamber therein;
    a filtration tank removably positioned within said chamber;
    a hydro filter disposed within said filtration tank and including an inner tube and an outer tube which are concentrically arranged to define an annular space therebetween, a top end of said inner tube communicating with a hose of said vacuum to suction a return stream, including contaminants, therethrough, said outer tube being closed at its bottom and spaced axially from an open lower end of said inner tube, an upper portion of said outer tube having an inlet port, said inlet and outlet ports opening to the interior of said filtration tank and being open to said annular space between said concentric inner and outer tubes, such that liquid filling the filtration tank above the level of said at least one water inlet port is aspirated by said return stream to cause contaminants within said return stream to be entrained by said water for primary filtration of said return flow stream as said return stream flows through said annular space and out said outlet port; and
    a baffle projecting outwardly from said outer tube, said baffle being adjacent said outlet port and including a horizontal planar plate and a vertical planar plate, said vertical and horizontal plates in combination preventing water from entering an exhaust passage of said filtration tank.

11. The hydro vacuum extraction machine of claim 10, further comprising;
    a connector for connecting said hydro filter to said filtration tank in a removable manner, such that said hydro filter, including said inner and outer tubes, can be removed for cleaning of said filtration tank and said hydro filter, wherein said connector includes a projection extending from said outer tube and a guide groove provided in said filtration tank, said projection being received in said guide groove.

12. The hydro vacuum extraction machine of claim 11, wherein projection and said guide groove have a dove-tailed shape.

13. The hydro vacuum extraction machine of claim 10, wherein said horizontal plate extends from a top of said outlet port and said vertical plate extends from a side of said outlet port.

14. The hydro vacuum extraction machine of claim 13, wherein said horizontal plate and said vertical plate are integral to each other.

15. The hydro vacuum extraction machine of claim 10, further comprising:
   a suction motor;
   a suction passage communicating said suction motor with said filtration tank so as to suction said return stream from said filtration tank to the atmosphere; and
   a filter disposed downstream of said suction motor for further filtering said return stream.

16. A hydro vacuum extraction machine operable in a vacuum mode and a steam cleaning mode, comprising:
   a casing;
   a module for storing a solution for use in said steam cleaning mode, said module being removably secured to said outer casing such that said module can be removed when said extraction machine is used in said vacuum mode, said module straddling said casing;
   a hydro filtration unit disposed in said tank for filtering contaminated air in a return stream when used in said vacuum mode and for collecting said solution when used in said steam cleaning mode; and
   a vacuum motor for suctioning one of contaminated air and a spent cleaning solution into said hydro filtration unit.

17. The hydro vacuum extraction machine of claim 16, wherein said hydro filtration unit includes a filtration tank and a hydro filter disposed within said filtration tank, said hydro filter including an inner tube and an outer tube through which said contaminated air flows when suctioned into said hydro filtration unit.

18. The hydro vacuum extraction machine of claim 17, wherein said inner and outer tubes are completely removable from said filtration tank to allow easy cleaning thereof.

19. The hydro vacuum extraction machine of claim 16, wherein said hydro filtration unit comprises:

a filtration tank;
a hydro filter including an inner tube and an outer which are concentrically arranged in said filtration tank to define an annular space between said inner and outer tubes, a top end of said inner tube communicating with a hose of said vacuum extraction machine to suction said return stream, including contaminants, therethrough, said outer tube being closed at its bottom and spaced axially from an open lower end of said inner tube, an upper portion of said outer tube having an outlet port and a lower portion of said outer tube having an inlet port, said inlet and outlet ports opening to the interior of said filtration tank and being open to said annular space between said concentric inner and outer tubes, such that liquid filling the filtration tank above the level of said at least one water inlet port is aspirated by said return stream to cause contaminants within said return stream to be entrained by said water for primary filtration of said return flow stream as said return stream flows through said annular space and out said outlet port; and
connecting means for connecting said hydro filter to said filtration tank in a removable manner, such that said hydro filter can be removed for cleaning of said filtration tank and said hydro filter.

20. The hydro vacuum extraction machine of claim 19, wherein said connecting means includes a projection extending from said outer tube and a guide groove provide in said filtration tank, said projection being received in said guide groove.

21. The hydro vacuum extraction machine of claim 20, wherein projection and said guide groove have a dove-tailed shape.

22. The hydro vacuum extraction machine of claim 16, where said casing includes a compartment and a cover which covers said compartment and wherein a portion of said module is received in said compartment when said module is disposed on said casing with said cover being in an open position.

23. The hydro vacuum extraction machine of claim 22, wherein said module includes a pump for pumping said solution, said pump being located in said portion of said module received in said compartment.

24. The hydro vacuum extraction machine of claim 16, wherein said module includes a substantially U-shaped portion.

* * * * *